United States Patent
Wells

(10) Patent No.: US 11,827,007 B2
(45) Date of Patent: Nov. 28, 2023

(54) SYSTEM FOR NOISE ABATEMENT

(71) Applicant: Bradley Gill Wells, Canon City, CO (US)

(72) Inventor: Bradley Gill Wells, Canon City, CO (US)

(73) Assignee: Bradley Gill Wells, Canon City, CO (US)

( * ) Notice: Subject to any disclaimer, the term of this patent is extended or adjusted under 35 U.S.C. 154(b) by 0 days.

(21) Appl. No.: 17/184,786

(22) Filed: Feb. 25, 2021

(65) Prior Publication Data

US 2022/0266570 A1 Aug. 25, 2022

(51) Int. Cl.

| | |
|---|---|
| A47J 42/00 | (2006.01) |
| B32B 5/32 | (2006.01) |
| B32B 5/18 | (2006.01) |
| B32B 27/36 | (2006.01) |
| B32B 27/06 | (2006.01) |
| B32B 3/26 | (2006.01) |
| A47J 43/07 | (2006.01) |
| G10K 11/168 | (2006.01) |
| G10K 11/20 | (2006.01) |
| A47J 42/38 | (2006.01) |
| B32B 1/08 | (2006.01) |
| B32B 1/02 | (2006.01) |

(Continued)

(52) U.S. Cl.
CPC ............... *B32B 5/32* (2013.01); *A47J 42/38* (2013.01); *A47J 43/07* (2013.01); *B32B 1/02* (2013.01); *B32B 1/08* (2013.01); *B32B 3/266* (2013.01); *B32B 5/022* (2013.01); *B32B 5/18* (2013.01); *B32B 5/245* (2013.01); *B32B 27/065* (2013.01); *B32B 27/36* (2013.01); *G10K 11/168* (2013.01); *G10K 11/20* (2013.01); *B32B 2262/0276* (2013.01); *B32B 2262/065* (2013.01); *B32B 2266/0207* (2013.01); *B32B 2272/00* (2013.01); *B32B 2307/102* (2013.01); *G10K 2210/118* (2013.01); *G10K 2210/3224* (2013.01)

(58) Field of Classification Search
CPC ... A47J 42/38; A47J 43/07; B32B 2266/0207; B32B 2262/065; B32B 2262/0276; B32B 5/245; B32B 5/18; B32B 5/022; B32B 3/266; G10K 11/20; G10K 11/168
See application file for complete search history.

(56) References Cited

U.S. PATENT DOCUMENTS

| | | | | |
|---|---|---|---|---|
| 5,965,851 | A | * | 10/1999 | Herreman ............... B32B 11/10 181/290 |
| 2002/0047061 | A1 | * | 4/2002 | Wulfman ................ A47J 42/38 241/100 |
| 2017/0335852 | A1 | * | 11/2017 | Myers McCarthy ........................ F04D 29/665 |

* cited by examiner

*Primary Examiner* — Ellen S Hock

(57) ABSTRACT

A system for abating noise emanating from a kitchen electric appliance includes a base of a predetermined size, comprising a first instance of a noise reflecting material, so that said base is disposed underneath, supporting, and contiguous to said kitchen electric appliance, and a sleeve of a predetermined size, including a second instance of a noise reflecting material, one or more layers of at least one noise absorbing material, one closed end, and one open end, so that said one open end slides over said kitchen electric appliance and is contiguous to said base. Said noise is effectively abated by reverberating between said first instance of said noise reflecting material and said second instance of said noise reflecting material and is attenuated by said one or more layers of said at least one noise absorbing material.

13 Claims, 3 Drawing Sheets

(51) Int. Cl.
*B32B 5/02* (2006.01)
*B32B 5/24* (2006.01)

SYSTEM FOR NOISE ABATEMENT

CROSS-REFERENCE TO RELATED APPLICATIONS

N/A

BACKGROUND OF THE INVENTION

1. Field of the Invention

The present invention is in the field of noise abatement and pertains particularly to kitchen electric appliances.

2. Description of Related Art

In the art of noise abatement for kitchen electric appliances, there are several problems to solve, and currently no products on the market to solve them. Some examples of such kitchen electric appliances include, but are not limit to, coffee bean grinders, spice grinders, smoothie makers, margarita makers, blenders, and food processors. Additionally, there are portable instances of such devices that are battery and USB powered.

The dangers of noise pollution are well-documented. According to OSHA (The Occupational Safety and Health Administration), exposure to high levels of noise can lead to hearing loss, tinnitus, stress, anxiety, high blood pressure, gastrointestinal problems, and chronic fatigue. These kitchen electric appliances can produce noise levels of more than 93 dB (decibels) according to ASHA (American Speech-Language-Hearing Association), which is characterized as Extremely Loud.

Another problem is that the noise is annoying and disruptive to conversations, TV, music, babies, pets, and people sleeping. No one likes to have information drowned out by loud noises when there is a special news bulletin, amber alert, or sports action moment. Sleeping through even a few seconds of 93+dB of noise to grind fresh coffee beans or to blend a health drink in the morning is unlikely. Waiting for sleepers to get up is painful. Such noise can also lead to unpleasant social interactions.

The prior art designs and usability in the field of noise abatement for kitchen electric appliances are somewhat unreasonable and inefficient, and mostly relate to sound muffling. A material thickness required to effectively muffle any meaningful noise level from these appliances would be very bulky making the invention unattractive, and difficult to use and store. Disengaging, cleaning, and reengaging such prior art inventions with these appliances may be challenging. Kitchen electric appliances do not all emit the same noise frequencies, even for the same type of appliance such as a blender. Therefore, an instance of such an invention that is somewhat effective for one model of a brand of blender for example, may be totally ineffective for use with another model of even the same brand of blender, not to mention other brands and types of kitchen electric appliances. Operating a power switch for an appliance that is underneath such bulk would also be challenging. Additionally, the prior art would only work for a narrow subset of such appliances with easily accessible power switches of specific types us as a pushbutton or plunger. Much of the prior art does not completely enclose the kitchen electric appliances thus letting sound escape making them inefficient.

Many of the materials available in this field are noxious, environmentally unfriendly to dispose of, and pollute the environment during the manufacturing processes. This is another area that is well-documented.

In conclusion, the prior art in this field is ineffective on many levels. The proof is that there are no such devices for sale on the market.

Therefore, what is clearly needed is a noise abatement system for kitchen electric appliances that solves the problems mentioned above.

BRIEF SUMMARY OF THE INVENTION

In one embodiment of the invention a system for abating noise emanating from a kitchen electric appliance is provided, comprising a base of a predetermined size, comprising a first instance of a noise reflecting material, thereby said base is disposed underneath, supporting, and contiguous to said kitchen electric appliance, and a sleeve of a predetermined size, comprising a second instance of a noise reflecting material, one or more layers of at least one noise absorbing material, one closed end, and one open end, thereby said one open end slides over said kitchen electric appliance and is contiguous to said base whereby said noise is effectively abated by reverberating between said first instance of said noise reflecting material and said second instance of said noise reflecting material, and is attenuated by said one or more layers of said at least one noise absorbing material.

Also in one embodiment said kitchen electric appliance is further controlled by a power adapter on/off switch. Also in one embodiment said system further comprises one or more airgaps between said one or more layers of said at least one noise absorbing material and said second instance of said noise reflecting material thereby increasing noise absorption and providing frequency tuning. In this embodiment the system further comprising one or more spacers thereby maintaining said one or more airgaps. Also in one embodiment said second instance of said noise reflecting material and said one or more layers of said at least one noise absorbing material are pliable thereby a pressure can be applied thereof and transferred to said kitchen electric appliance. In this embodiment the system further comprises a protrusion whereby said pressure can be focused onto said kitchen electric appliance. Also in one embodiment said second instance of said noise reflecting material is disposed as the outermost component of said sleeve thereby being the farthest away from said kitchen electric appliance. Also in one embodiment said first instance of said noise reflecting material further comprises a vibration absorbing property. Also in one embodiment said noise reflecting material comprises a natural neoprene rubber foam. Also in one embodiment said noise reflecting material further comprises a laminate, bonded to one or more sides. In this embodiment said laminate is a recycled polyester. Also in one embodiment said one or more layers of said at least one noise absorbing material is a micro perforated plate. In this embodiment said micro perforated plate comprises varying attributes thereby increasing noise absorption and providing frequency tuning. Also in one embodiment said one or more layers of said at least one noise absorbing material is a jute felt. Also in one embodiment said sleeve further comprises one or more instances of a decorative cover. Also in one embodiment said base further comprises a vibration absorbing material. Also in one embodiment said base further comprises a decorative cover.

DETAILED DESCRIPTION OF THE INVENTION

The inventor provides a unique, effective, and easy-to-use system for substantially abating noise emanating from kitchen electric appliances. The present invention is described in enabling detail in the following examples, which may represent more than one embodiment of the present invention.

Figure 1:
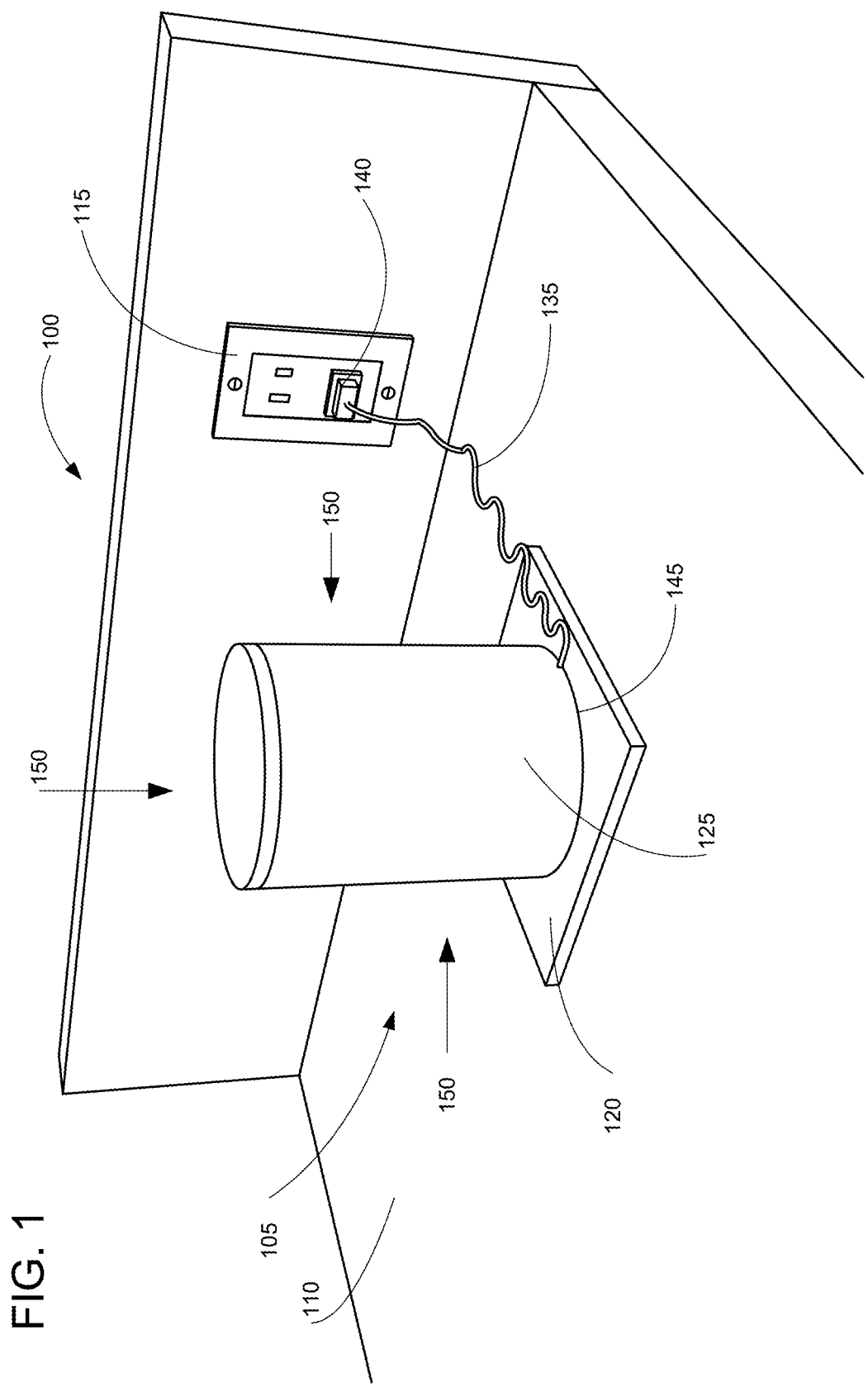
FIG. 1 is a perspective view of an example kitchen area with a noise abatement system installed according to an embodiment of the present invention.

FIG. 1 is a perspective view of an example kitchen area 100 with a noise abatement system 105 installed according to an embodiment of the present invention. Example kitchen area 100 may comprise a countertop 110 and an electrical power outlet 115. Noise abatement system 105 may comprise a base 120 and a sleeve 125. An instance of a kitchen electric appliance 130 (Not shown. See FIG. 2) is enclosed by noise abatement system 105 resulting in a seal 145 and may connect to electrical power outlet 115 using an electrical cord 135 and an electrical plug 140. The back, front, left-side, and right-side views of base 120 and sleeve 125 are identical to what is displayed. Top and bottom views of base 120 are also identical.

Figure 2:
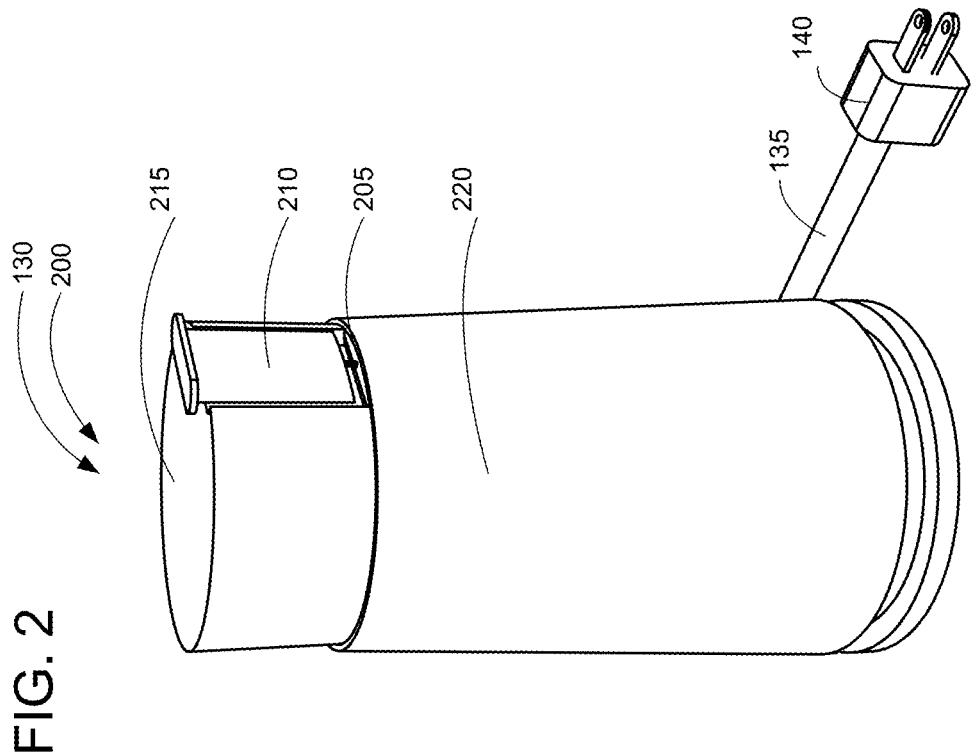
FIG. 2 is a perspective view of a set of elements common to most instances of kitchen electric appliance 130 for use according to an embodiment of the present invention in FIG. 1.

FIG. 2 is a perspective view of a set of elements 200 common to most instances of kitchen electric appliance 130 for use according to an embodiment of the present invention in FIG. 1. Set of elements 200 may comprise a power switch 205, a plunger 210, a container 215, a processing mechanism (not shown), a housing 220, a motor (not shown), electrical cord 135, and electrical plug 140. The orientation, disposition, arrangement, placement, inclusion, or exclusion of set of elements 200 are just examples and may change without departing from the spirit and scope of use with the present invention.

To install an embodiment of noise abatement system 105, base 120 may be placed on countertop 110, kitchen electric appliance 130 may be placed on base 120, and sleeve 125 may be slid over kitchen electric appliance 130 coupling with base 120 and electrical cord 135 creating seal 145.

To activate/deactivate an embodiment of kitchen electric appliance 130 after installing an embodiment of noise abatement system 105 where sleeve 125 is pliable, a pressure 150 may be applied/removed by the user to sleeve 125 that aligns with and transfers through, to power switch 205.

Figure 3:
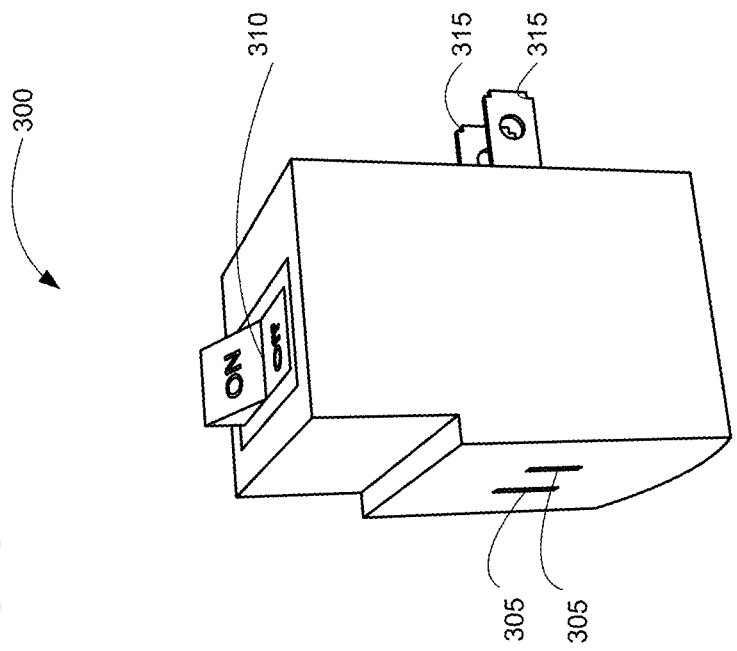
FIG. 3 is a perspective view of an example of a power adapter on/off switch for use according to an embodiment of the present invention.

FIG. 3 is a perspective view of an example of a power adapter on/off switch 300 for use according to an embodiment of the present invention. Power adapter on/off switch 300 is a commercially available device and may comprise a set of female electrical contacts 305, an on/off switch 310, and a set of male electrical contacts 315. Although not shown, a passthrough ground contact may be provided.

To activate/deactivate an instance of kitchen electric appliance 130 after installing an embodiment of noise abatement system 105 where sleeve 125 is less pliable, or the location/type of power switch 205 may be unsuitable for applying pressure 150, and power switch 205 is a latching switch type which maintains its state after activation/deactivation, power adapter on/off switch 300 may be employed. Activate power switch 205 in the normal manner, install noise abatement system 105 as previously described, insert electrical plug 140 into set of female electrical contacts 305, insert set of male electrical contacts 315 into electrical power outlet 115, and toggle on/off switch 310 to activate/deactivate kitchen electric appliance 130.

Kitchen electric appliance 130 may comprise many types, shapes, designs, configurations, and sizes. Some examples include, but are not limited to, coffee bean grinders, spice grinders, smoothie makers, margarita makers, blenders, mixers, and food processors. Also included are portable instances powered by batteries or USB cables.

Power switch 205 may comprise many types, shapes, designs, configurations, and sizes for use according to an embodiment of the present invention. Some examples include, but are not limited to, plunger 210, pushbutton, container twist, container top push, rotating knob, and toggle.

Power switch 205 may be located on, in, around, or under any area of kitchen electric appliance 130 for use according to an embodiment of the present invention.

Figure 4:
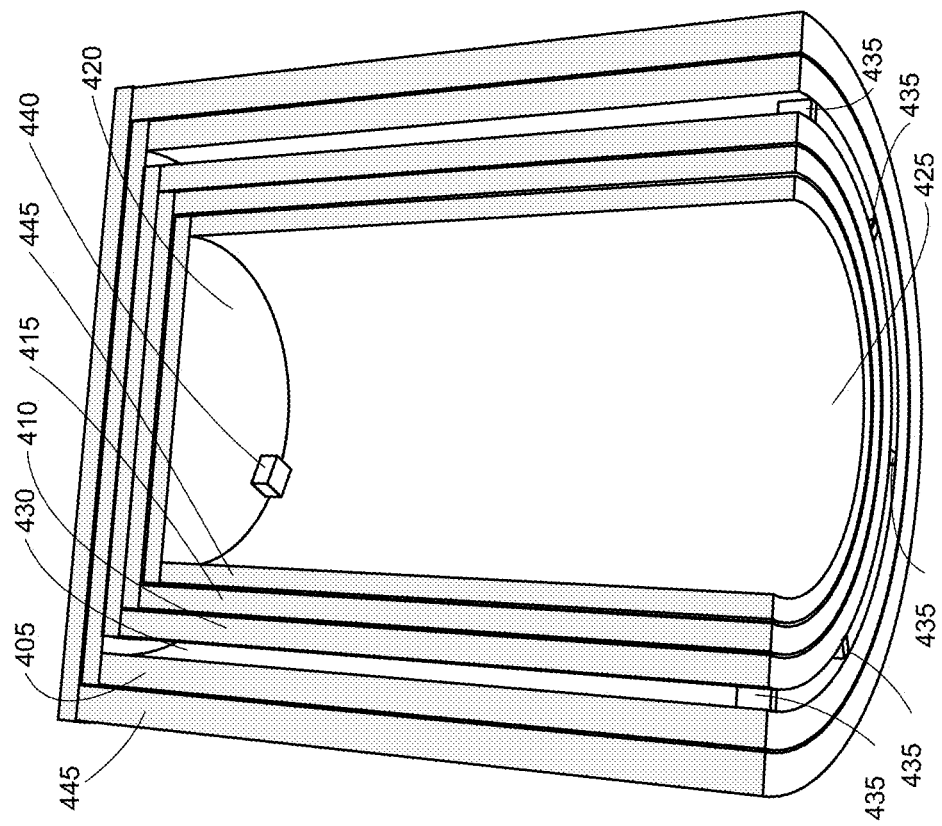
FIG. 4 is a perspective section view of sleeve 125 according to an embodiment of the present invention.

FIG. 4 is a perspective section view of sleeve 125 according to an embodiment of the present invention. Sleeve 125 may comprise a set of layers 400 of a noise reflecting material 405, a noise absorbing micro perforated plate material 410, and a noise absorbing material 415, each with a closed end 420 and an open end 425, an airgap 430, a spacer 435, a protrusion 440, and a decorative cover 445.

Sleeve 125 may be generally cylindrical in shape but may be square, rectangular, or irregular, and may be slightly larger in size to accommodate varying types, shapes, designs, configurations, and sizes of kitchen electric appliance 130. Each layer of set of layers 400 may be identical in shape, proportionately increasing in size from the innermost layer outward, successively sliding over the previous layer, comprised of closed end 420 and open end 425, and may be attached to each other using friction, adhesive, or hook-and-loop fasteners.

Each layer of set of layers 400 may be cut to the appropriate size and the two appropriate edges may be attached to each other on the edges or overlapped forming a cylinder. A corresponding and appropriately sized piece may be cut to fit inside or over one end of each cylinder and attached to the cylinder creating closed end 420, leaving the other end open creating open end 425. In both instances the corresponding pieces may be attached using glue, double sided sticky tape, hook-and-loop fasteners, contact cement, metallic tape, heat, or sewn. A similar process may be used for instances where sleeve 125 is not cylindrical. One or more layers of set of layers 400 may be alternatively molded as one piece. The order, instances, and materials of set of layers 400 may be changed to tune noise abatement performance for different instances of kitchen electric appliance 130 without departing from the spirit and scope of the present invention.

Noise reflecting material 405 may be comprised of a natural, closed-cell, plant-based, foam rubber such as Lexcell Closed Cell Foam Rubber, laminated with recycled polyester fabric on one or more sides making it ecofriendly, durable, pliable, lightweight, vibration dampening, and noise reflective. Recycled polyester is available in a variety of colors, patterns, and thicknesses to match and complement a kitchen décor. The laminate may also be recycled spandex or any number of a wide range of materials such as textiles. Other examples of noise reflecting material 405 may include, but are not limited to, neoprene, glass, mass loaded vinyl, and plastics.

Noise absorbing micro perforated plate material 410 may be comprised of a pliable, lightweight, metalized film with polyethylene woven reinforcement material. The industry term "micro perforated plate" is sometimes referred to as "micro perforated panel" or abbreviated as MPP. Other embodiments may include regular tin foil, or a rigid mild steel may be used. Perforation specifications such as hole diameters, configurations, spacing, and perforation rates may be performed by third-party companies and used across one or more instances of noise absorbing micro perforated plate material 410 to increase the range of noise absorption frequencies. These specifications may be tuned to increase noise abatement performance for specific instances or groups of kitchen electric appliance 130.

Noise absorbing material 415 may be comprised of one or more layers of pliable, lightweight, ecofriendly, biodegradable jute felt. This material is readily available from many manufactures. Specifications such as weight and thickness may be tuned to increase noise abatement performance for different instances of kitchen electric appliance 130. Other examples of noise absorbing material 415 may comprise a wide range of fabrics, textiles, foams, and generally porous materials.

Figure 5:
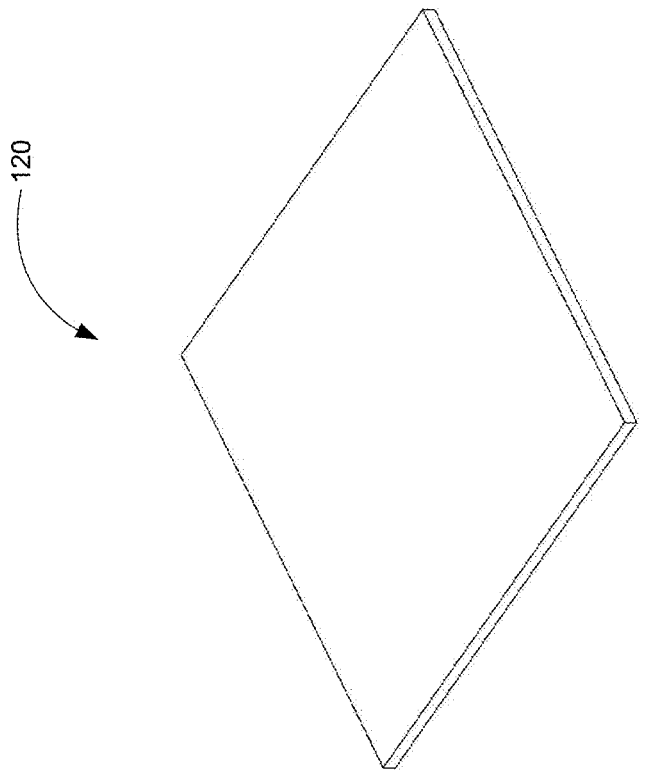
FIG. 5 is a perspective view of base 120 according to an embodiment of the present invention.

FIG. 5 is a perspective view of base 120 according to an embodiment of the present invention. Base 120 may be square, circular, rectangular, or irregular in shape, somewhat oversized to accommodate varying designs and sizes of kitchen electric appliance 130, and may comprise the same noise reflecting material 405 and laminate described for sleeve 125. Base 120 may be trimmed by a user to fit and may be attached to the bottom of kitchen electric appliance 130 using for example glue, double sided sticky tape, hook-and-loop fasteners, or contact cement. The size of base 120 may also be customized to user supplied dimensions.

Base 120 and sleeve 125 may also comprise an additional vibration dampening material (not shown) as an attribute of noise reflecting material 405 or as an additional layer of set of layers 400. Although most noise reflecting materials do provide some vibration dampening attributes, a specific vibration dampening material may be used where instances of kitchen electric appliance 130 generate excessive vibration.

One or more instances of decorative cover 445 may be attached to the outside/inside/bottom edge of sleeve 125, and one or more sides of base 120. Decorative cover 445 may be comprised of a wide variety of materials, colors, patterns, and textures including, but not limited to, environmentally friendly textiles such as TENCEL MODAL, TENCEL LYOCELL, or recycled polyester fabrics. This provides for an ecofriendly, aesthetically pleasing, and changeable look for noise abate system 105 to match a décor, season, or holiday. Decorative cover 445 may be easily detached/reattached for cleaning or replacement using double sided sticky tape, hook-and-loop fasteners, or a friction fit as examples.

One or more instances of airgap 430 of varying sizes may be added between one or more layers of set of layers 400. Scientific studies prove that airgaps between surfaces increase noise absorption. As an example, varying the size of airgap 430 between noise reflecting material 405 and noise absorbing micro perforated plate material 410 can attenuate specific frequencies making for a tunable implementation to specific noise attributes associated with an instance of kitchen electric appliance 130.

One or more instances of spacer 435 may be used to maintain one or more instances of airgap 430 between one or more layers of set of layers 400. Spacer 435 may be comprised of adhesive-backed pads. As an example, instances of an adhesive-backed pad may be spatially separated from each other and glued to noise reflecting material 405 or noise absorbing micro perforated plate material 410 thereby maintaining airgap 430. Stacking instances of spacer 435 adjusts airgap 430 providing frequency tuning for specific noise attributes associated with an instance of kitchen electric appliance 130. Spacer 435 may have a shape that is round, square, rectangular, or irregular.

In another embodiment, one or more instances of spacer 435 may span a portion of or all of one or more instances of airgap 430 with enough width and height to adequately maintain airgap 430.

In other embodiments spacer 435 may be attached using hook-and-loop fasteners or a variety of adhesives.

Protrusion 440 may be user installed, user relocatable, and may span an instance of airgap 430 between the innermost layer of set of layers 400 and power switch 205, to concentrate pressure 150 onto power switch 205. This provides for a more generic and larger sized sleeve 125 that can accommodate more sizes of kitchen electric appliance 130. Additionally, less pressure 150 would be required by a user to activate power switch 205 especially in instances where power switch 205 may be somewhat recessed. Protrusion 440 may be comprised of adhesive-backed pads, which may be cut into smaller pieces. The smaller pieces may be stacked to increase the thickness. The adhesive may be removed and reapplied several times before losing stickiness and needing to be replaced. Protrusion 440 may also be attached/detached using hook-and-loop fasteners. Multiple instances of protrusion 440 may be used for multiple instances of power switch 205 spanning multiple instances of kitchen electric appliance 130 owned by a user. Protrusion 440 may have a shape that is round, square, rectangular, or irregular.

Noise abatement system 105 may be custom manufactured per user-provided measurements or manufactured in several generic sizes to fit ranges of instances of kitchen electric appliance 130. Additionally, noise abatement system 105 may be tuned to specific noise characteristics associated with specific instances or groups of kitchen electric appliance 130 by changing the order, numbers, and attributes, of set of layers 400, and airgap 430 thereby abating the maximum noise levels emanating thereof.

Noise abatement system 105 considers the latest innovative technologies in the art, resulting in an invention that is lightweight, easy to install/remove, easy to clean, comprises only 2 main parts, has no moving parts, absorbs vibration, adds very little bulk, is ecofriendly, offers customizable decorative covers, is frequency tunable, completely encloses and works with most instances of kitchen electric appliance 130, one instance may be used on more than one user instance of kitchen electric appliance 130, thereby effectively and substantially abates noise by continually reverberating and absorbing noise among set of layers 400.

It will be apparent to one with skill in the art that the noise abatement system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for abating noise emanating from a kitchen electric appliance comprising:
   a base of a predetermined size, comprising a first instance of a noise reflecting material comprising a natural neoprene rubber foam thereby said base is disposed underneath, supporting, and contiguous to said kitchen electric appliance; and
   a sleeve of a predetermined size, comprising a second instance of a noise reflecting material comprising a natural neoprene rubber foam, one or more layers of at least one noise absorbing material, one or more airgaps between said one or more layers of said at least one noise absorbing material and said second instance of said noise reflecting material thereby increasing noise absorption and providing frequency tuning, one or more spacers thereby maintaining said one or more airgaps, one closed end, and one open end, thereby said one open end slides over said kitchen electric appliance and is contiguous to said base;
   whereby said noise is effectively abated by reverberating between said first instance of said noise reflecting material and said second instance of said noise reflecting material and is attenuated by said one or more layers of said at least one noise absorbing material and said one or more airgaps.

2. The system of claim 1 whereby said kitchen electric appliance is further controlled by a power adapter on/off switch.

3. The system of claim 1 wherein said second instance of said noise reflecting material and said one or more layers of said at least one noise absorbing material are pliable thereby a pressure can be applied thereof and transferred to said kitchen electric appliance.

4. The system of claim 3 further comprises a protrusion whereby said pressure can be focused onto said kitchen electric appliance.

5. The system of claim 1 wherein said second instance of said noise reflecting material is disposed as the outermost component of said sleeve thereby being the farthest away from said kitchen electric appliance.

6. The system of claim 1 wherein said first instance of said noise reflecting material further comprises a vibration absorbing property.

7. The system of claim 1 wherein said laminate is a recycled polyester.

8. The system of claim 1 wherein said one or more layers of said at least one noise absorbing material is a micro perforated plate.

9. The system of claim 8 wherein said micro perforated plate comprises varying attributes thereby increasing noise absorption and providing frequency tuning.

10. The system of claim 1 wherein said one or more layers of said at least one noise absorbing material is a jute felt.

11. The system of claim 1 wherein said sleeve further comprises one or more instances of a decorative cover.

12. The system of claim 1 wherein said base further comprises a vibration absorbing material.

13. The system of claim 1 wherein said base further comprises a decorative cover.

* * * * *